Figure 1:
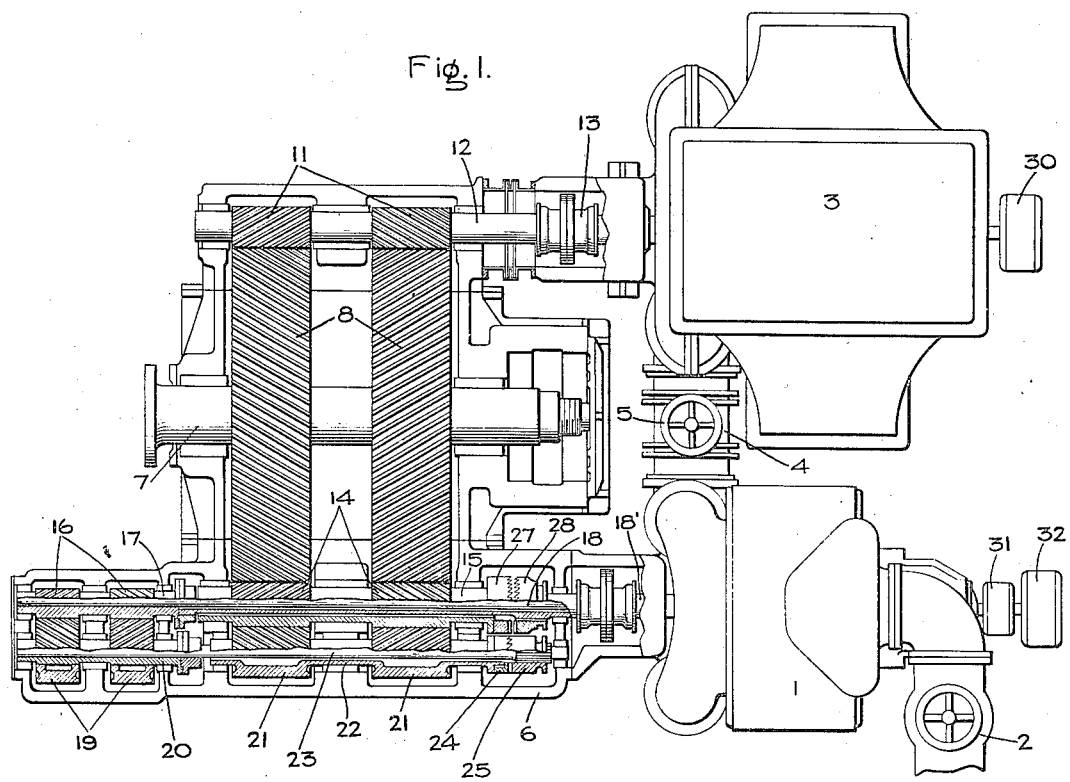

Aug. 7, 1928.

W. L. R. EMMET 1,680,209

SHIP PROPULSION SYSTEM

Filed Aug. 30, 1926

Inventor:
William L. R. Emmet,
by *Alexander T. ———*
His Attorney

Patented Aug. 7, 1928.

1,680,209

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SHIP-PROPULSION SYSTEM.

Application filed August 30, 1926. Serial No. 132,842.

My invention relates to power systems wherein clutches are used to transmit motion from one shaft, pulley, gear or other revolving piece of machinery to another revolving part, and to connect or disconnect these parts at will, and an object of my invention is to synchronize the movements of the clutch-connected parts by exerting forces upon these parts that vary in an amount depending on their departure from relative angular correspondence in position, and to lock the parts together by a positive clutch when the speeds of the parts are equal, to avoid thereby undue strain on the parts or damage to the clutch.

I have illustrated my invention in a system of geared ship propulsion, where it is of particular utility. In such systems in order to adapt a prime mover, whose natural or most efficient speed of operation is in excess of the natural or most efficient speed of a screw propeller, suitable speed reducing gearing is interposed between the prime mover and the propeller which it is adapted to drive to secure thereby the most efficient operation of both the prime mover and the propeller.

In the design of geared turbines for naval vessels, it is necessary to build a turbine and gear which will carry a very large output for high speed conditions, and also provide for high economy operation at something less than half speed, which corresponds to the cruising condition and which also corresponds to 1/20 to 1/8 of full power.

In a straight-geared construction, the turbine speed will go down in proportion to the propeller speed, and this combined with the increased available energy which must be handled by the first few wheels of the turbine at light loads, results in a very uneconomical operation of the turbine at the cruising speed. In application, Serial No. 67,424, of Bruce O. Buckland and Glenn B. Warren, filed November 6, 1925, for geared turbine installation, and assigned to the same assignee as the present application, it has been suggested that in order to secure higher economy at the cruising speed a high-pressure turbine be arranged with suitable gearing so that the gear ratio between the high-pressure turbine and the propeller may be changed so as to permit running the high pressure turbine at nearly full speed during the cruising operation. To permit this operation, change-speed gears and clutches are employed, and, in view of the great amount of energy to be transmitted, the clutches are preferably of the positive type, provided with interlocking portions. Because of the inertia of the moving parts, and the amounts of power involved, it is very desirable that the parts to be connected by the clutch be brought to the same speed before they are joined by the clutch. It has been suggested in the above-identified application of Bruce O. Buckland and Glenn B. Warren to control the admission of steam to the turbine wheels or to a brake on the turbine shaft, to control thereby the speed of the turbine relatively to the propeller, so that the parts may be brought to the same speed before connecting them by the clutch.

In accordance with my invention I provide means whereby the relative speeds of the turbine and the propeller are controlled in a simple and reliable manner so that the clutch elements may be connected without difficulty notwithstanding variations in load on the propeller due to wind and sea conditions. This I accomplish by employing synchronous generators connected to the revolving parts mechanically and to each other electrically through synchronizing electrical connections. With this arrangement, if the electrically interconnected generators tend to depart from synchronism, there will be an interchange of electrical power between these generators which will exert forces upon the revolving parts to which these generators are connected that will vary in amount with the departure from relative angular correspondence in position of the parts, and these forces will tend to keep the parts in synchronism. It is possible by noting the amount of electric power exchanged between the alternators to determine when the parts are operating synchronously, for at synchronous operation there will be no exchange of power between the generators; for example, a current meter inserted in the electric connections between the generators may be used to indicate to the operator when the interchange of electrical power is low and changing at a slow rate and at that time the operator, being aware that the clutch parts are revolving at the same speed, and in a proper relative position, will operate the clutch to connect or disconnect the rotating parts.

As these generators are to be used only intermittently, it is possible to work both their electrical and magnetic circuits at high densities, and thereby secure generators of small size capable of exerting for a short time large corrective forces, and these generators, because of their small size, may be suitably located in the transmission system.

In addition to the simplicity of the arrangement, there is the further advantage of simplicity of control. This results from the fact that when the turbine is disconnected from the propeller load it is still loaded to a certain extent by an auxiliary generator which renders it less sensitive to the throttle than if it were unloaded.

My invention will be better understood by reference to the accompanying drawing in connection with the following description, and its scope may be pointed out in the appended claims.

Figure 2:
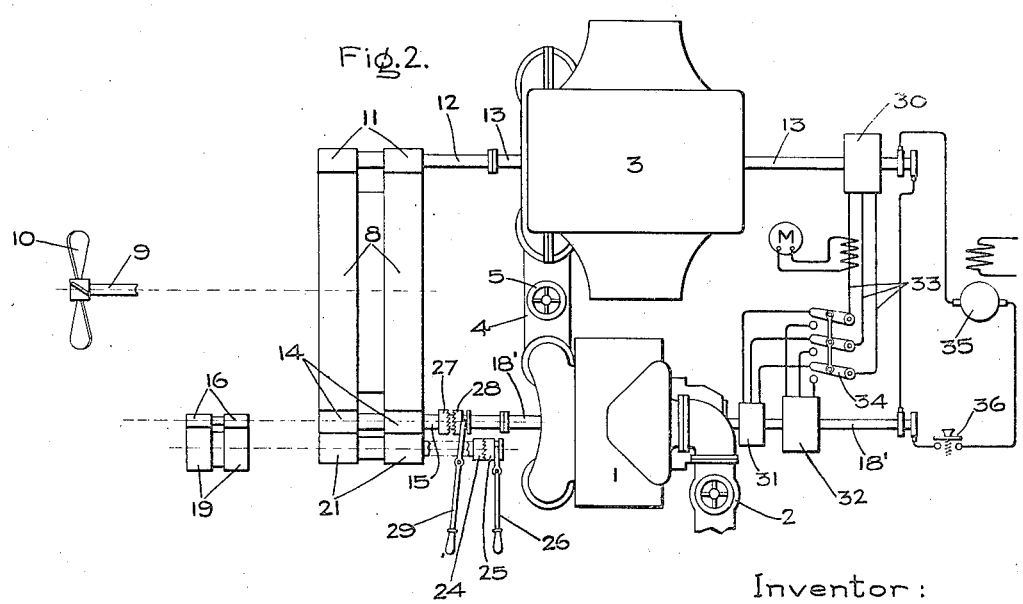

In the drawing, Fig. 1 is a plan view, with parts broken away, of a geared turbine installation embodying my invention, and Fig. 2 is a more or less diagrammatic illustration of the same installation, showing the arrangement of electrical connections between the synchronizing generators.

Referring to the drawing, Fig. 1, 1 indicates a high-pressure turbine provided with a valve 2, which controls the admission of elastic fluid to it. This turbine exhausts into a low pressure turbine 3 to which it is connected by a conduit 4. Both these turbines exhaust into a condenser (not shown) and the arrangement is such that either or both turbines may operate at the same time. A valve 5 in conduit 4 may be used to shut off the steam supply to turbine 3, in which case a valve (not shown) leading from turbine 1 to the condenser would be opened. If turbines 1 and 3 are to be used, this last-mentioned valve will be closed, and valve 5 between turbines 1 and 3 opened so that turbine 1 exhausts into turbine 3, and turbine 3 in turn into the condenser.

Adjacent these turbines is a gear casing 6 having suitable bearings in which is journaled a shaft 7 of a driven gear 8. Shaft 7 is connected to the propeller shaft 9 which carries propeller 10. Meshing with gears 8 are pinions 11, the shaft 12 of which is carried in bearings in gear casing 6, and is coupled directly to shaft 13 of low pressure turbine 3. Also journaled in bearings in the gear casing 6, and meshing with gear wheels 8, are pinions 14, mounted on a quill shaft 15. Arranged in axial alignment with pinions 14 are pinions 16, carried by shaft 17 journaled in bearings in casing 6. Shaft 17 is connected to the shaft of the high pressure turbine 1 by a shaft 18, which extends through the quill shaft 15 and forms in substance an extension of the shaft 18' of the high pressure turbine 1. Meshing with pinion 16 are gears 19, having a shaft 20 journaled in suitable bearings in casing 6. In axial alignment with gears 19 are pinions 21, which mesh with pinions 14 and are carried by a quill shaft 22 journaled in suitable bearings in casing 6. Extending through quill shaft 22 is a shaft 23, which forms an extension of shaft 20. This shaft is suitably supported at its outer end by a bearing carried by the gear casing 6. Shaft 22 is adapted to be connected to shaft 23 by a clutch comprising a fixed member 24 attached to one end of shaft 22 and a sliding member 25 splined on shaft 23. The sliding member 25 is adapted to be moved by a lever 26 into and out of engagement with the fixed member 24. Fastened to the right hand end of quill shaft 15 is a clutch member 27, and splined to the adjacent portion of shaft 18 is its complementary member 28, which is adapted to be moved into and out of engagement with the member 27 by a lever 29.

As thus arranged, turbine 1 may drive gears 8 with a single speed reduction through clutch 27—28 and gears 14, or with a double speed reduction through shaft 18, gears 16 and 19, shaft 23, clutch 24—25, gears 21 and gears 14. The arrangement illustrated in Figs. 1 and 2 shows this latter connection.

In the system illustrated, both turbines 1 and 3 will be operated at the same speed for the full speed operation of the ship, and turbine 1 will be operated at twice the speed of turbine 3 for cruising conditions. It is, of course, apparent that other speed ratios may prove desirable under different conditions.

In view of the loads on the gearing, and the speeds involved, it is necessary, as before pointed out, to bring the clutch members to the same speed of rotation before engaging them to make a connection. This I accomplish by connecting at some suitable place in the transmission two synchronous generators, one of which is connected to the transmission on one side of the clutch, and the other of which is connected to the transmission on the other side of the clutch. These generators are electrically connected with each other through synchronizing electrical connections, and include in their circuit means for indicating the exchange of power between them.

Referring to Fig. 2 of the drawing, which illustrates the application of my invention to the system just described, a synchronous generator 30 is connected to the shaft 13 of turbine 3, and two synchronous generators 31 and 32, of different pole numbers, to the shaft 18' of turbine 1. In the present arrangement generator 30 will rotate at the same speed as the clutch member 27 of clutch 27—28, through shaft 13 of turbine 3, shaft 12 and gears 11, 8 and 14, and clutch member 24 of clutch 24—25 will rotate at the same speed through the turbine shaft 13 of turbine 3, shaft 12 and gears 11, 8, 14 and 21. Generators 31 and 32 on the other hand, are connected to rotate at the same speed as clutch member 28 of clutch 27—28 by shaft 18' of turbine 1 and to rotate at twice the speed of clutch member 25 of clutch 24—25 through shaft 18' of turbine 1, shaft 18, gears 16 and 19 and shaft 23. As thus arranged, when the clutch members 27 and 28 of clutch 27—28 are rotating at the same speed, generators 30 and 32 will likewise be rotating at the same speed.

These generators, consequently, are made of the same pole number, so that when interconnected electrically they will rotate at synchronous speed when clutch members 27 and 28 rotate at synchronous speed. When clutch members 24 and 25 of clutch 24—25 rotate at synchronous speed, the shaft of turbine 1 will be rotating at twice the speed of the shaft of turbine 3, and, in order that generators on these shafts may operate in electrical synchronism, the generator on the shaft of turbine 1 must have half the number of poles of the generator on the shaft of turbine 3. For this purpose generator 31 is provided with half the number of poles of generator 30, and consequently, when this generator is electrically connected with generator 30, and the two are in electrical synchronism, the clutch parts 24 and 25 of clutch 24—25 will be in synchronism.

In operation, when changing from full speed to cruising speed, or vice versa, the operator will suitably throttle the turbines until they rotate at approximately the desired speed, when the synchronizing generators suitable for the connection desired will be connected with each other and excited. The operator will then notice when the exchange of power between the synchronous generators is at a minimum, or at zero, and subject to a slow rate of change whereupon he will operate the desired clutch for making the desired connection. For example, if the operator wishes to change from full speed to cruising speed, clutch 27—28 will be disengaged, and an electrical connection made between synchronous generators 30 and 31 by switch 34 and leads 33. Turbine 1 will now be throttled until its speed is approximately twice that of turbine 3, when synchronous generators 30 and 31 will be excited by an exciter 35 by closing switch 36 which is normally biased to an open position. Until the turbines 3 and 1 are rotating at the proportional speeds of 1 to 2, there will be an interchange of power between generators 30 and 31, which will operate to synchronize the transmission on each side of clutch 24—25, and, when this power decreases to zero, which may be noted by an indicating current meter M connected between the generators 30 and 31, the operator will move the clutch lever 26 to make the connection. Then the switch 36 will be released to open position and the generators 30 and 31 allowed to rotate unexcited until a change is made in the gearing for full speed operation of the vessel when generators 30 and 32 will be electrically connected by switch 34 and the above operation repeated for synchronizing the clutch elements 27 and 28 followed by the operation of clutch lever 29 to couple these members. Preferably, clutch levers 26 and 29 will be interlocked with each other in such manner that the engagement of one clutch by one lever cannot take place until the other clutch has been opened by the other lever. Examples of such interlocking arrangements are well known and have not been illustrated in the drawing for the purpose of simplifying the disclosure.

It is obvious that instead of two generators 31 and 32, as shown in the illustrated embodiment of my invention, a single generator with a double or convertible winding might be used. Furthermore, it is apparent that the arrangement may be made automatic so that an operator has only to move a controller to secure the sequence of operations above described, the meter M or an equivalent synchronism indicator being used to effect operation of the clutch members.

In cases where the gear reduction is such that it is not economically possible to provide dynamo-electric machines with pole numbers exactly proportional to the speeds of the rotating parts of the clutch to which they are connected when these parts are in synchronism, the pole numbers may be selected so as to give substantially this condition. For example, if the speed ratio was not exactly 2 to 1, due to the use of a gear with a hunting tooth, generators with pole numbers in the ratio of 2 to 1 could still be used since, when the generators were in electrical synchronism, the clutch parts would move relatively to each other at such a slow rate of speed that the parts could be engaged without difficulty or danger. Consequently, by the term "synchronism" in the appended claims I intend to cover arrangements where the parts are brought to speeds substantially synchronous, as well as exactly synchronous.

In conclusion I would state that my invention is of general application and that the number of clutches and the number of synchronous generators used will depend on the particular arrangement of parts to which my invention is applied. The illustrated embodiment, however, is one wherein my invention is of particular utility.

In accordance with the provisions of the patent statutes, I have described the principles of operation of my invention, together with the apparatus which I consider to represent the best embodiment thereof, but I desire to have it understood that the apparatus shown is only illustrative, and I aim to cover in the appended claims the embodiments which fall within the scope of my invention.

What I claim as new and desire to secure by Letters Patent of the United States, is:

1. In combination, a plurality of rotatable clutch elements, means for exerting a force upon the elements which increases with their departure from relative angular correspondence in position to synchronize said elements, and means for operating said elements.

2. In combination, a plurality of rotatable clutch elements, an alternating current synchronous machine connected to each of said elements, synchronizing electrical connections between said machines for preserving a predetermined speed relation of the elements by an interchange of power between the synchronous machines through the synchronizing connections, and means for operating said clutch elements.

3. In combination, a plurality of rotatable clutch elements, an alternating current synchronous machine connected to each of said elements, synchronous electrical connections between said machines for preserving a synchronous relation between the elements by an interchange of power between the synchronous machines through the synchronous connections, means for indicating the exchange of power between said synchronous machines, and means for operating said clutch elements.

4. In a ship propulsion system comprising a high pressure turbine designed for operation at a plurality of speeds in conjunction with a low pressure turbine operating at one of said speeds to drive a propeller load through reduction gearing and change speed gearing, clutches for changing the geared connection of said high pressure turbine to said reduction gears, means for maintaining said clutch elements in synchronism prior to the operation of said clutch comprising a plurality of synchronous alternating current machines mechanically connected to the clutch parts and electrically connected to each other, means for exciting said machines, means for indicating when the exchange of power is at a minimum between said machines, and means for operating said clutches.

5. In a ship propulsion system comprising a high pressure turbine designed for operation at a plurality of speeds in conjunction with a low pressure turbine to drive a propeller load, change speed gearing connecting said high pressure turbine with said low pressure turbine, clutch means for mechanically connecting said turbines through said change speed gearing with the desired speed ratio, means for synchronizing the elements of said clutches prior to engagement comprising a plurality of synchronous alternating current electric machines mechanically connected to said clutch elements and electrically connected to each other for preserving synchronous relationship between the machines by interchange of electrical power, means for indicating when said elements are in synchronism, and means for operating said clutch elements.

6. In a ship propulsion system, a prime mover gear connected to a propeller through change speed gearing, clutches for changing the gear ratio between said prime mover and the propeller, means for equalizing the speeds of the elements of said clutches prior to engagement comprising a plurality of synchronous alternating current machines mechanically connected to the clutch elements and electrically connected to each other by synchronous electrical connections for preserving synchronous operation between the elements by an interchange of power between the synchronous machines, means for exciting said machines, means for indicating when the elements of the clutches are in synchronism, and means for operating said clutches.

7. In a ship propulsion system, a propeller, a plurality of prime movers, reduction gearing through which one of said prime movers may drive said propeller, reduction gearing through which another of said prime movers may drive said propeller, one of said reduction gearings being arranged to provide adjustable speed relationships between the corresponding prime mover and the propeller; a plurality of clutch devices for selecting the desired speed adjustments, synchronous dynamo electric machines driven from the respective prime movers, means for interconnecting said machines so as to maintain said prime movers in synchronism, and means for adjusting the synchronizing connections arranged to adjust the speed relationship between the prime movers to correspond to the speed adjustments provided by said clutch members.

8. A mechanical transmission system comprising a driving shaft and a driven shaft, adjustable reduction gearing between said shafts, a plurality of clutches for selecting the desired gear reduction, synchronous dynamo-electric machines mechanically connected with the transmission system on opposite sides of the respective clutches, said dynamo-electric machines having pole numbers proportional to the speeds of the rotating parts to which they are connected when the two parts of a clutch to be operated are in synchronism, and means for establishing circuit connections between said machines for synchronous operation thereof to correspond to the gear reduction desired.

In witness whereof, I have hereunto set my hand this 27th day of August, 1926.

WILLIAM L. R. EMMET.